United States Patent [19]
Rinnhofer et al.

[11] Patent Number: 5,465,943
[45] Date of Patent: Nov. 14, 1995

[54] BOTTOM OR WALL STRUCTURE FOR A METALLURGICAL VESSEL

[75] Inventors: Johann Rinnhofer, Vienna; Robert Schmidberger, Trofaiach; Volker Pawliska, Millstatt, all of Austria; Giorgio Cappelli, Basiglio, Italy

[73] Assignee: Veitsch-Radex Aktiengesellschaft fur feuerfeste Erzeugnisse, Vienna, Austria

[21] Appl. No.: 70,395

[22] PCT Filed: Dec. 4, 1991

[86] PCT No.: PCT/EP91/02305

§ 371 Date: Jun. 7, 1993

§ 102(e) Date: Jun. 7, 1993

[87] PCT Pub. No.: WO92/10593

PCT Pub. Date: Jun. 25, 1993

[30] Foreign Application Priority Data

Dec. 7, 1990 [AT] Austria .................................... 2483/90
Feb. 2, 1991 [DE] Germany ............................ 41 03 156.3

[51] Int. Cl.⁶ .................................................. B22D 41/00
[52] U.S. Cl. ............................ 266/220; 266/275; 266/217
[58] Field of Search .................................. 266/217, 220, 266/275, 218; 222/603

[56] References Cited

U.S. PATENT DOCUMENTS

| | | | |
|---|---|---|---|
| 1,763,248 | 6/1930 | Moore | 266/220 |
| 4,903,948 | 2/1990 | Wolf et al. | 266/220 |
| 5,067,693 | 11/1991 | Lepoutre et al. | 266/220 |

*Primary Examiner*—Scott Kastler
*Attorney, Agent, or Firm*—John F. A. Earley; John F. A. Earley, III

[57] ABSTRACT

A bottom or wall structure for a metallurgical vessel has a fireproof lining adjacent to an outer metallic envelope (10) of the vessel. The fireproof lining has on the side opposite to the metallic envelope (10) a wear lining (26) that is gas permeable in at least one of its sections and that covers with its gas permeable section at least one gas rinsing device (14) provided with an associated gas inlet (12), whereas the gas rinsing device (14) is set into a gas-tight receptacle (18).

25 Claims, 5 Drawing Sheets

BOTTOM OR WALL STRUCTURE FOR A METALLURGICAL VESSEL

BACKGROUND OF THE INVENTION

The present invention pertains to a bottom or wall structure for a metallurgical vessel with a refractory lining, which is adjacent to an outer metallic envelope of the vessel and has, on the side facing away from the metallic envelope, a wear lining, which is permeable to gas in at least some of its sections and covers with its gas-permeable section at least one gas purging device with an associated gas inlet.

Such a bottom structure has been known from DE 37 42 861 C1. A passage opening, within which a metallic tube, which is fixed in the passage opening with mortar, is located in the area of a refractory outer lining. A metallic baffle plate, whose surface area is substantially larger than the cross-sectional area of the passage opening, is arranged in the wear lining immediately above the said passage opening, so that gas admitted via the tube first flows through the said mortar and then a first section of the gas-permeable wear lining before it diffuses further, deflected to the side by the baffle plate, around the outer edges of the baffle plate, through the porous wear material and into the metal melt.

The prior-art bottom lining is provided for an electric arc furnace and it shall ensure, besides long service life, above all introduction of the purging gas distributed over a large area into the metal melt to form a large purging spot in order to ensure a uniform and smooth burning of the arc.

Due to the lateral deflection of the treating gas—in a plane that is essentially parallel to the outer lining or the wear lining—the gas flow is deliberately deflected laterally, as a consequence of which appreciable amounts of gas diffuse laterally in an uncontrolled manner and, above all, undesirably escape to the outside through the outer lining. In addition, the flow rate is markedly reduced due to the distribution of the gas flow, and it is therefore not always possible to penetrate the topmost layer of the wear lining, which will sinter under the effect of the heat, thus becoming gastight. As a result, the purging effect will not be satisfactory.

The melting process in the metallurgical vessel is to be generally facilitated, the rate of decarbonization increased, and the melting energy reduced by a gas purging device.

DE 39 01 926 C1 discloses a gas purging device, in which the purging cone is located within the outer lining, and a finite wear hood made of refractory material is arranged above the gas outlet-side front surface of the purging device instead of a wear lining, wherein the wear hood is approximately in the form of a hemisphere and is designed as a gas-permeable wear hood or is provided with a gas-permeable insert. Diffusion of the gas flow into the wear hood and consequently distribution of the gas fed in take place in this case as well, as a consequence of which the gas flow is reduced, the size of the purging spot is increased, and circulation of the metal melt is possible only under certain conditions.

SUMMARY OF THE INVENTION

Therefore, the basic task of the present invention is to provide a bottom or wall structure of this class, which can be used for the longest possible time and prevents the diffusion and especially the loss of purging gas as much as possible, in other words, which guarantees the directed, controllable feed of even larger amounts of treating gas into the metal melt over the largest possible area. It shall be possible to interrupt the gas flow and to turn it on again.

The present invention is based on the finding that this task can be accomplished by the directed guiding of the treating gas outside the actual gas purging device (gas distribution device) as well. In other words: The present invention proposes measures for guiding the treating gas even in the area between the gas outlet side of the gas purging device and the inlet into the metal melt.

To achieve this, a bottom or wall structure of this class possesses the following characteristics in its most general embodiment:

The purging device is surrounded by a gastight receptacle circumferentially and possibly also on the bottom side, and the receptacle projects over the gas purging device in the upward direction into the area of the wear lining, the area of the gas-permeable wear lining surrounded by the receptacle is free of baffle plates.

Thus, a "guide" is provided for the purging gas, quasi in extension of the gas purging device or the purging jet, which [guide] may consist of a gastight, refractory ceramic mass, a gastight, refractory sleeve, a gastight, temperature-resistant fiber mat, and/or a gastight, metallic component, individually or in combination, so that lateral and reverse diffusion of the purging gas is prevented with certainty, and the purging gas can enter the metal melt, as desired, only in a directed manner and in extension of the gas feed, but over a relatively large surface through the wear lining.

Gas purging devices usually have a round, but occasionally also square or rectangular cross section. Therefore, if the terms "cylindrical," "annular" or the like are used, they refer to all types of cross-sectional shapes.

Consequently, when it is proposed, according to an advantageous embodiment, that the receptacle be formed by a cylindrical, refractory component, this cylindrical component may have either a round, or a square, rectangular, or, e.g., octagonal cross section. The cross-sectional shape of the receptacle is usually adapted to that of the gas purging device. However, this is not absolutely necessary. What is decisive is that the receptacle shall provide a guide for the treating gas fed in quasi in extension of the gas purging device. Various specific embodiments will be described below.

To increase safety against lateral diffusion of the treating gas and thus to avoid a loss of purging gas, it can be proposed, as an additional measure, that the receptacle be back-lined circumferentially with a gastight, refractory mass, which is thus extended between the outer lining and the wear lining. This gastight, refractory mass will consequently usually be in the form of a ring disk, which is arranged around the receptacle between the outer lining and the wear lining. Mainly a loss of purging gas via the steel jacket (the metallic envelope) of the furnace is thus prevented from occurring, even if the purging gas diffuses backward in the direction of the outer lining beyond the edge of the receptacle described, but this is very extensively ruled out by the receptacle described.

The gastight, refractory mass shall correspond (in the direction of the gas flow) to approximately 0.1 to 0.5 times the height of the gas purging device. Consequently, it is thick enough to prevent diffusion of the gas.

Its width (viewed radially to the direction of the gas flow) is preferably selected to be such that it corresponds to 0.5 to 5 times the gas purging device. Thus, the mass surrounds the gas purging device or the receptacle in such a large area that is sufficient for preventing lateral gas diffusion from taking place even in extreme cases.

For special fields of application, additional safety can be provided by also limiting the refractory mass circumferentially by a gastight, refractory ring, which extends, starting from the outer lining, past the gastight, refractory mass beyond the receptacle and into the wear lining, to a short distance in front of the contact area with the metal melt. A "second tank" is thus quasi placed around the gas purging device.

In an alternative embodiment, the gas purging device is back-lined at the top end (facing the metal melt) first circumferentially with a gastight, refractory mass, which thus extends between the outer lining and the wear lining, and which is joined circumferentially by the gastight receptacle Or a gastight ring of the type described above, and these [the receptacle or the ring] extend from the outer lining far into the wear lining up to a short distance from the surface of the wear lining. These devices themselves can also be back-lined with a gastight, refractory mass.

Consequently, the gas flow is not guided vertically into the metal melt directly in extension of the gas purging device in this embodiment, but it is possible for part of the gas bubbles to diffuse somewhat to the side through the porous, refractory wear lining before it reaches the gastight receptacle/the gastight ring and is subsequently deflected upward in the direction of the metal melt. However, it is ensured even in this embodiment, due to the gastight, refractory mass between the gas purging device and the envelope, that a lateral and reverse diffusion via the outer lining or the steel jacket of the furnace is prevented with absolute certainty. Consequently, no purging gas is lost in this embodiment either, but the purging spot is enlarged, depending on the width of the gastight, refractory mass.

The ring, which preferably consists of metal or a refractory ceramic, may consist of one or more parts, just like the receptacle, which may be made of the same material. A one-part, monolithic design is preferable, so that the receptacle and/or ring can be used as a ready-made component. However, it is also possible to assemble the receptacle or the ring from discrete elements. It is always ensured that the envelope as a whole is impermeable to the purging gas.

The receptacle or the refractory ring may extend into the wear lining over about ⅔ of the thickness (height) of the wear lining. It would be possible, in principle, to further extend the receptacle/ring in the direction of the metal melt. However, by limiting the height, continued constant gas feed is made possible even in the case of erosion of the wear lining, and melting loss is prevented when a metallic envelope is used.

The gastight, refractory mass, the gastight, refractory receptacle, and the gastight, refractory ring may be made of different types of ceramic materials. Chemically bound or, e.g., pitch- or tar-bound ceramic types of materials are especially suitable. Magnesitic types are preferred especially for use in electric arc furnaces.

A mass based on low-iron magnesia, whose MgO content exceeds 90 wt. % and whose particle size is smaller than 2 mm and preferably 1 mm, is especially suitable for use as the gastight, refractory mass.

Low-iron, pitch- or tar-bound magnesia grades are also preferred for the gastight, refractory receptacle.

To optimize the passage of gas through the wear lining, the section of the wear lining extending directly above the gas purging device is made—in an advantageous embodiment of the present invention—of material which has a coarser particle size than the rest of the wear lining, and which preferably still has a network of open pores after sintering/fritting.

Dry monolithic hearth lining materials from alpine sintered magnesia, whose MgO content exceeds 50 wt. % and is preferably between 70 wt. % and 90 wt. %, and whose CaO content is between 8 wt. % and 15 wt. % may be mentioned as examples. The particle size used here should be approximately in the range of 3 to 8 mm, and a fine fraction should be eliminated as much as possible. The adjacent hearth lining material may consist of the same type, but with a fine component, or it may consist of a finer fraction altogether. The gas purging device may have many different designs. According to a first embodiment, a gas purging device with directed porosity is proposed, which makes possible the directed feed of the treating gas.

Gas purging devices with directed porosity of the type that can be used here are specifically described in *Radex-Rundschau*, 1986, p. 203, and 1988, p. 481.

Moreover, in an embodiment variant, the gas purging plug has an axial, central gas channel formed by a pipe and an outer pipe surrounding the pipe at a spaced location, wherein the pipes are positioned in such a way that they form an annular gap extending between them. The inner pipe or the annular gap may also be connected to separate gas feed lines. It is thus also possible to feed in different gases.

In an embodiment variant, the above-described gas purging plug shall be designed such that it is provided with a plurality of flow channels extending through the matrix material of the purging plug essentially in parallel to the pipes, which [flow channels] extend statistically distributed around the pipes and open into a gas distribution chamber on the side facing away from the metal melt, wherein the gas distribution chamber, the annular channel, and the gas channel formed by the pipe are sealed off from each other and can be connected to separate gas feed lines.

However, the gas purging device may also have a completely different design.

The gas purging device consists in this case of a gas distribution device, which is gastightly sealed from the outer lining or the metallic envelope of the vessel and from the lateral wall of the vessel. The receptacle shielding may also be formed by a plate, which analogously extends into the area of the wear lining, possibly up to a short distance from the area of the adjacent metal melt. The receptacle is preferably drawn around the bottom side as well, and the gas feed line opens into the bottom section. The bottom-side shielding may also be formed by the furnace envelope itself.

In this embodiment, the gas distribution device is designed with a plurality of gas outlets, which will thus extend over a wide area of the hearth. The gases can thus be admitted over a larger area of the hearth reliably and in a directed manner. The gas flow density, i.e., the volume flow per unit of area at the transition into the wear lining (the hearth lining), is relatively low even in the case of larger amounts of gas. In contrast, the distribution of the gases is highly uniform, so that undesired purging spots can no longer be formed on the surface of the metallurgical bath.

The wear lining is cooled at the same time, as a result of which wear is reduced. Large areas of the wear lining can thus be protected at the same time. The service life of the wear lining is considerably prolonged. If necessary, wear areas in the hearth of the metallurgical vessel can be cooled in a metered manner by correspondingly increasing the gas flow density in these areas.

The gas purging device (gas distribution device) may be designed as a system of pipes with a plurality of gas outlets. The following description of the figures, which therefore also contains generally valid characteristics, specifically describes this embodiment. A plurality of possibilities are available for designing and arranging the pipes. Thus, the tubular gas purging body may be directed in parallel to the metallic envelope of the metallurgical vessel. In this case, it is preferably provided with the gas outlets on the upper half of its circumferential area.

In another embodiment, it is proposed that the gas distribution device be designed as a large-surface hollow box with a plurality of gas outlets on the upper front surface. The gas purging device and the gastight receptacle may be made of one part. The section of the area that is effective from the viewpoint of purging can be additionally increased in this embodiment as well.

To avoid mechanical and/or thermal damage to the gas purging device, it is proposed in another embodiment that the gas distribution device be filled with a coarse-grained bulk material. For example, the tubular body or the hollow box is filled with a corresponding, coarse-grained, refractory mass in this case. At the same time, this also provides for safety against breakthrough of metal melt that may penetrate.

Especially the latter embodiments of the gas purging device (gas distribution device) make it possible to arrange it directly on the steel jacket of the metallurgical vessel. The steel jacket of the metallurgical vessel may also serve as a bottom-side cover at the same time, especially in the case of a metallic receptacle.

The above-described embodiments of the bottom lining can be made in this embodiment as well.

The bottom lining described can be used in a particularly advantageous manner in an electric arc furnaces, where directed and controllable circulation of the metal melt is of particular significance.

Further characteristics of the present invention will become apparent from the characteristics of the subclaims as well as the other application documents.

The present invention will be described in greater detail below on the basis of various exemplary embodiments, and these descriptions also contain characteristics that are generally essential for the present invention.

BRIEF DESCRIPTION OF THE DRAWINGS

The drawing shows, in highly schematic representations, in

DESCRIPTION OF THE PREFERRED EMBODIMENTS

Figure 1:
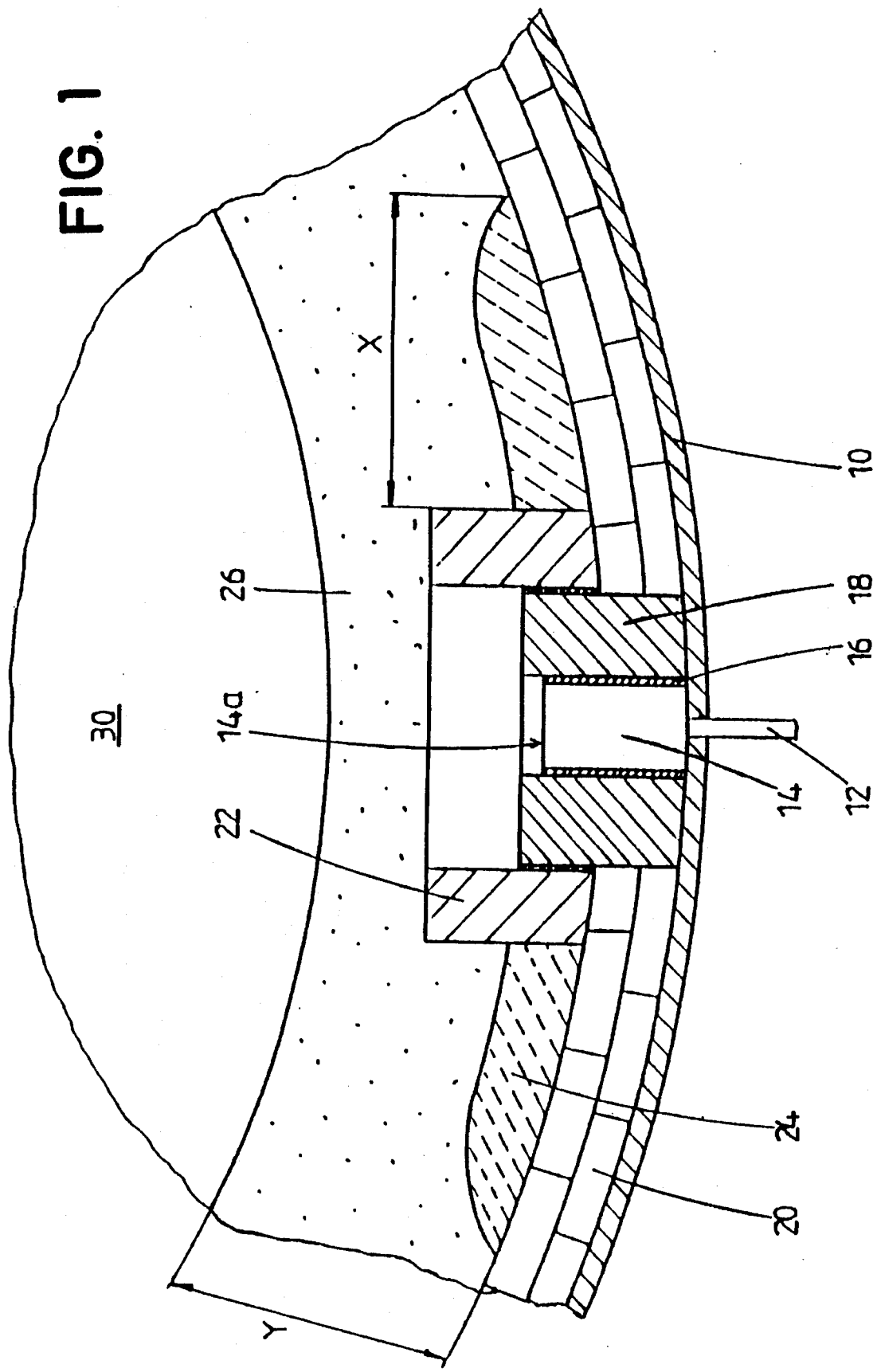
FIG. 1: a section through a bottom lining of a first embodiment of an electric arc furnace with a ceramic, refractory receptacle.

Identical or functionally identical components are designated by the same reference numerals in the figures.

FIG. 1 shows the steel jacket (metallic envelope) 10 of an electric arc furnace. A gas feed pipe 12 for a gas purging device, which is provided with directed pores (not shown) formed by small tubes, and which is generally designated by the reference numeral 14, passes through the said metallic envelope 10; the said small tubes are located in corresponding holes in the ceramic matrix material and are supplied with gas by a gas collection space (likewise not shown) in the lower area of the gas purging device, and this gas is thus discharged via the front surface 14a, which will be described in greater detail below.

The said gas purging device 14 is positioned with a gastight mortar layer 16 in a receptacle 18, which also consists of a gastight ceramic material. As is shown in the Figure, the said receptacle 18 projects over the said gas purging device 14 in the upward direction.

The said receptacle 18 is connected circumferentially, adjacent to the said metallic envelope 10, to an outer lining 20, which consists of ordinary—non-gastight—bricks. The thickness of the said outer lining 20 corresponds here to about half the height of the said receptacle 18.

The said receptacle 18 is surrounded in the top part by a gastight, refractory ceramic ring 22, which is seated on the said outer lining 20 and markedly projects over the said receptacle 18 in the upward direction, which will be described in greater detail below.

The said ring 22 and the said receptacle 18 are in turn connected to one another via a gastight, refractory mortar.

Finally, the figure shows a gastight, refractory, pitch-bound magnesia mass 24, which joins the lower end of the said ring 22 circumferentially and extends over a certain section "x" there, and finally extends in the direction of the said outer lining 20 to end there.

A wear lining 26 is located on the said outer lining 20, the mass 24, the said ring 22, the said receptacle 18, and the said gas purging device 14, and thus forms a second, upper cover layer of the refractory bottom lining.

The thickness of the said wear layer is designated by "y."

The said wear layer 26 is made of two different grades, namely, of a coarse-grained (4 to 8 mm) grade above the said gas purging device 14 and of a fine-grained (below 4 mm) grade with an MgO content of 82 wt. % and a CaO content of 12 wt. % in the rest of the area.

As is apparent from the figure, the said receptacle 18 extends over half of the height of the entire bottom lining, and the said ring 22 extends over about ⅔ of the height of the said wear lining 26.

The gas fed in via the said gas purging device 14 is now admitted into the metal melt designated as a whole by the reference numeral 30 in a directed manner through the coarser fraction of the said hearth mass 26, and directed guidance of the gas flow is ensured by the arrangement of the said receptacle 18 and of the said ring 22, through which the gas is unable to diffuse. However, should individual gas bubbles ever diffuse laterally beyond the top edge of the said ring 22, loss of gas is additionally prevented by the subsequent gastight, refractory ceramic mass 22.

Figure 2:
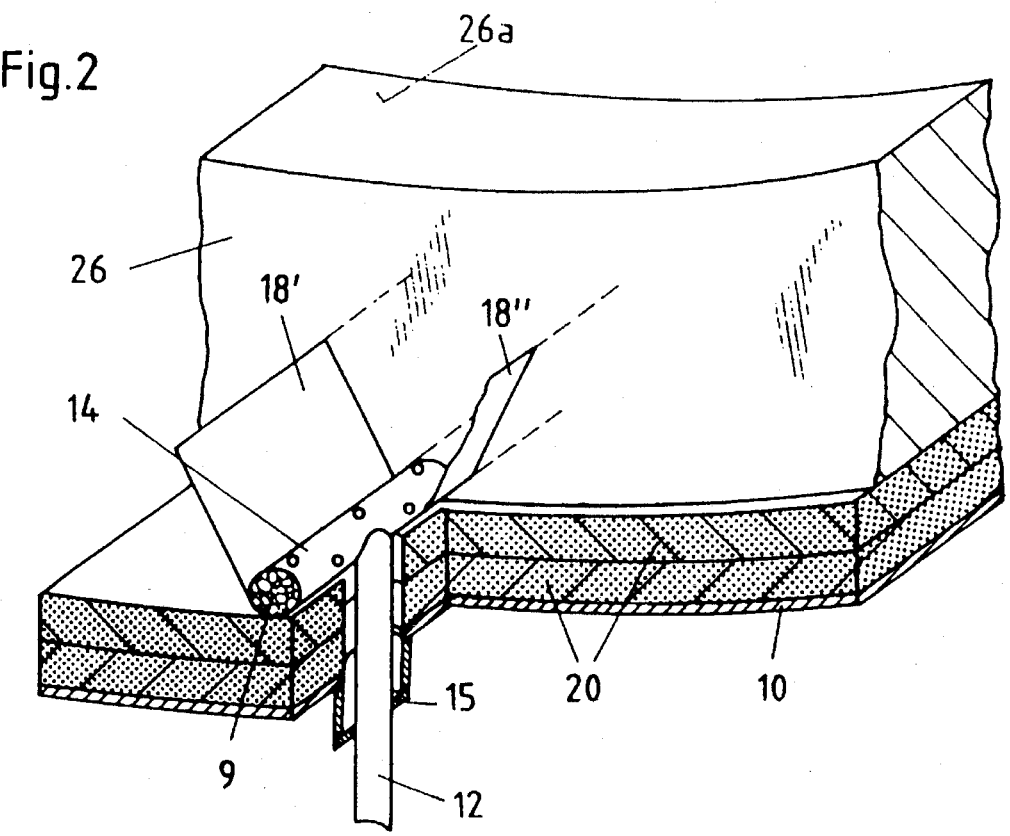
FIGS. 2, 3, 4, 5, 6 and 7: partially cutaway perspective partial views of further embodiments of the bottom lining for a metallurgical vessel.

In the embodiment variant shown in FIG. 2, the said safety or outer lining 20 is applied to the said steel envelope 10 of the vessel in the usual manner. The said gas purging device (gas distribution device) 14, which is designed as a system of pipes here, is located on this [the said safety or outer lining]. The said distribution device 14 is supplied via a said gas feed line 12, which is provided with a sealing socket 15 at its passage through the said steel envelope 10. The said distribution device 14 is filled with a coarse-grained, refractory, ceramic bulk material 9, here with a coarse-grained magnesia mass. The pipe, which forms the said distribution device 14, is provided with a plurality of gas outlets 17 on its top side.

The said distribution device 14 is embedded in the said layer 26 consisting of a gas-permeable hearth lining material, whose surface 26a faces the interior of the vessel (the metal melt). Shields 18', 18", which are designed as plates and have the task of the said receptacle 18 according to FIG. 1, and prevent gases from penetrating into the said outer lining 20, can be seen arranged obliquely in the upward direction on both sides of the said distribution device 14. It is obvious that the said plates 18', 18" are connected to one another in a gastight manner via connection plates at their lateral ends in order to thus prevent diffusion of gas in this direction.

Figure 3:
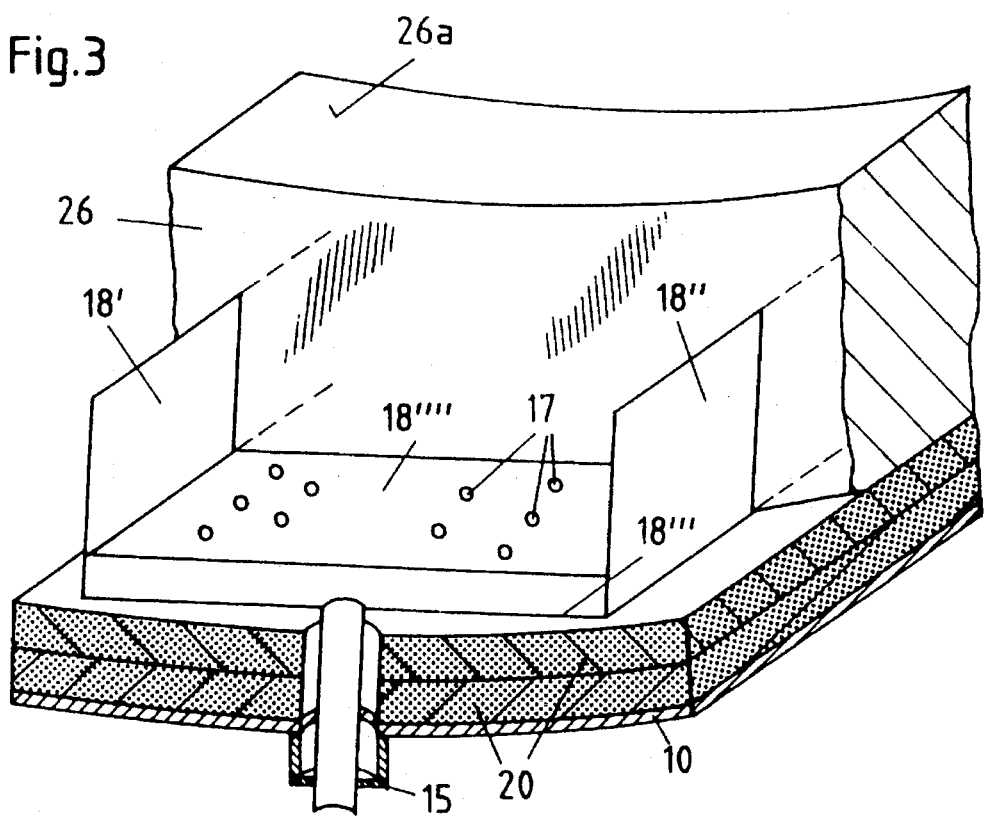

FIG. 3 shows a box-shaped distribution device 14 placed on the said outer lining 20. It consists of a bottom plate 18''', into which the said gas feed pipe 12 opens, of another plate 18'''' arranged above it at a spaced location, and of four lateral, upwardly extended shielding plates, of which the said plates 18', 18" can be recognized in the figure. Thus, a gastight hollow box is ultimately obtained, which is extended laterally in the upward direction with plates into the said wear lining 26, and the gases are able to be discharged through a plurality of said openings 17 in the said cover plate 18''''.

Figure 4:
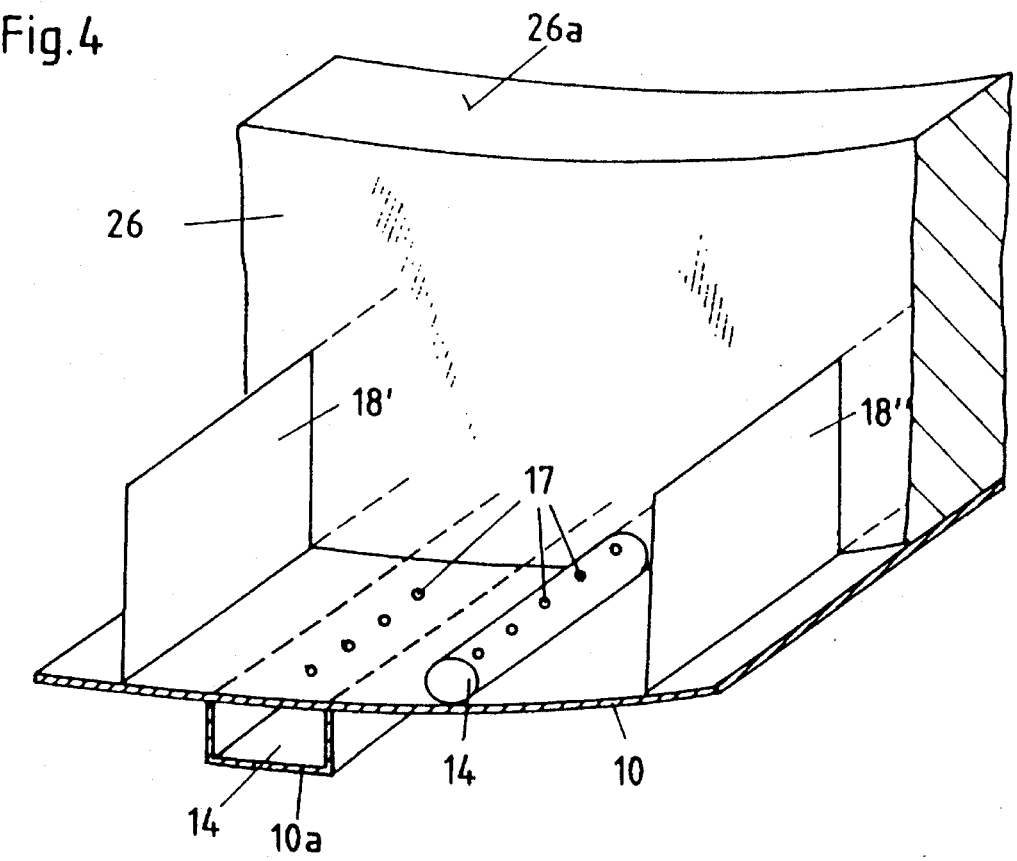

The exemplary embodiment according to FIG. 4 is a combination of the embodiments according to FIGS. 2 and 3. The said tubular gas distribution device 14 is attached (welded) directly onto the said steel envelope 10, and the lateral shielding plates, of which only the said plates 18', 18" are represented for clarity's sake, extend laterally at spaced locations from the said gas distribution device 14 vertically upward from the said plate envelope 10 and into the said wear lining 26.

FIG. 4 shows another possible embodiment, in which the said gas distribution device 14 is provided in the said steel envelope 10 itself, which is expanded for this purpose in the manner of a box (10a) in the downward direction, and which has said associated gas outlets 17 in the corresponding upper cover surface.

Figure 5:
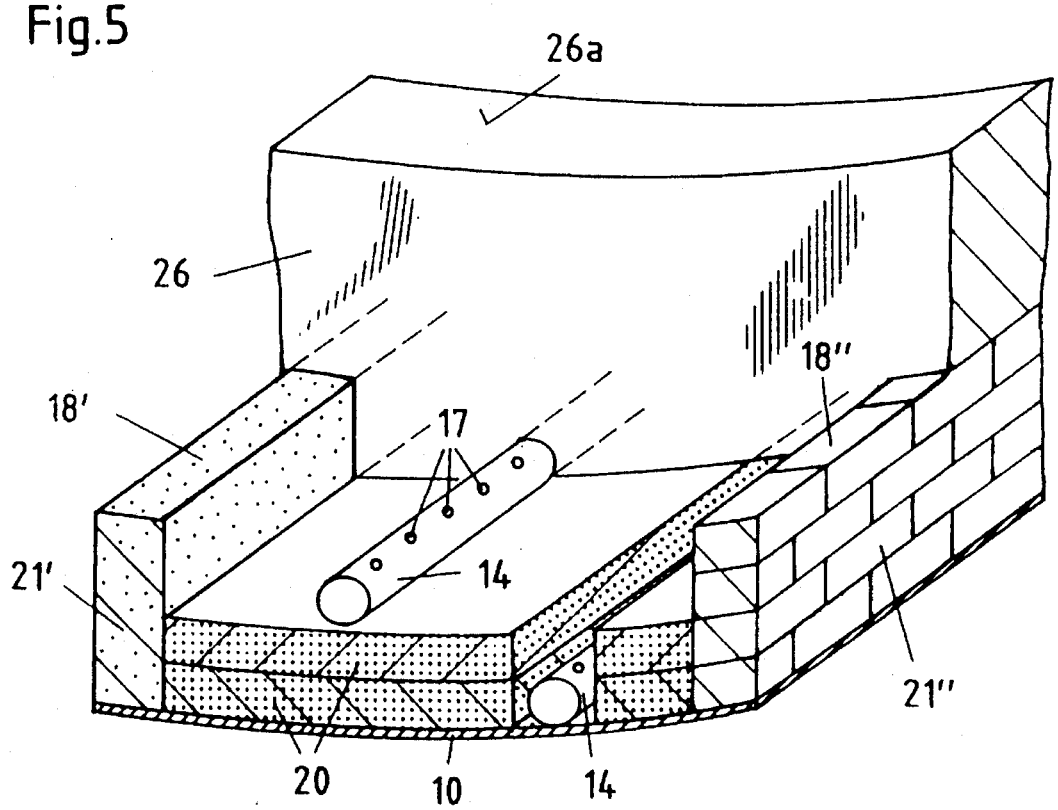

FIG. 5 shows two more embodiments of the bottom lining. A first, tubular gas distribution device 14 is arranged, analogously to the exemplary embodiment according to FIG. 4, directly on the said steel envelope 10 of the metallurgical vessel. The said outer lining 20 has a corresponding recess for this purpose. A second, tubular gas distribution device 14 is placed directly on the said outer lining 20. Both together are covered by lateral, gas-impermeable shields, which extend vertically from the said steel envelope 10 into the said wear lining 26 Two opposite shields 18', 18" are recognizable here, and the said shield 18' is made of a gas-impermeable refractory mass 21', and the said shield 18" is made of brickwork of gas-impermeable refractory bricks 21".

Figure 6:
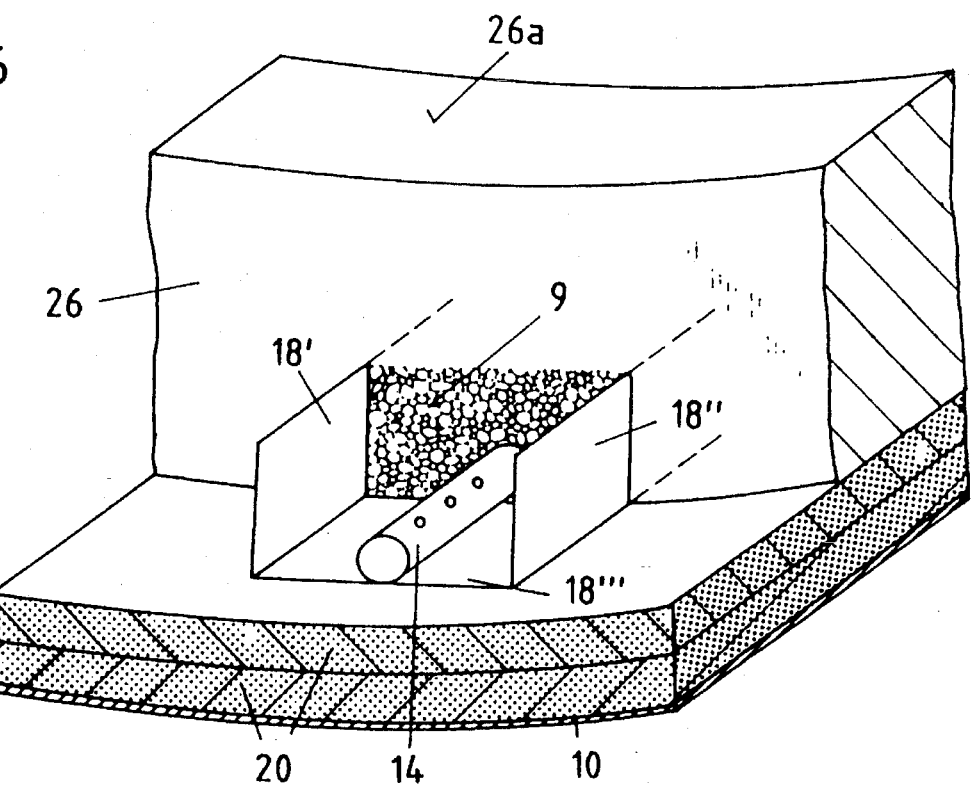

The said shield (receptacle) 18 in the exemplary embodiment according to FIG. 6 consists of two said plates 18', 18" extending at right angles to the said steel envelope 10 and of a said plate 18''', which connects the said two plates and lies on the said outer lining 20. The said tubular gas purging device 14 is located within a box, which is formed by the said shields 18', 18", is complemented by two additional plates (not shown here) extending at right angles to them, is open in the upward direction, and is filled with a said layer 9 consisting of a coarse-grained refractory material. The said layer 9 is in turn completely covered by the said wear layer 26, which extends around the said receptacle 18 on the said outer lining 20 on the outside as well.

Figure 7:
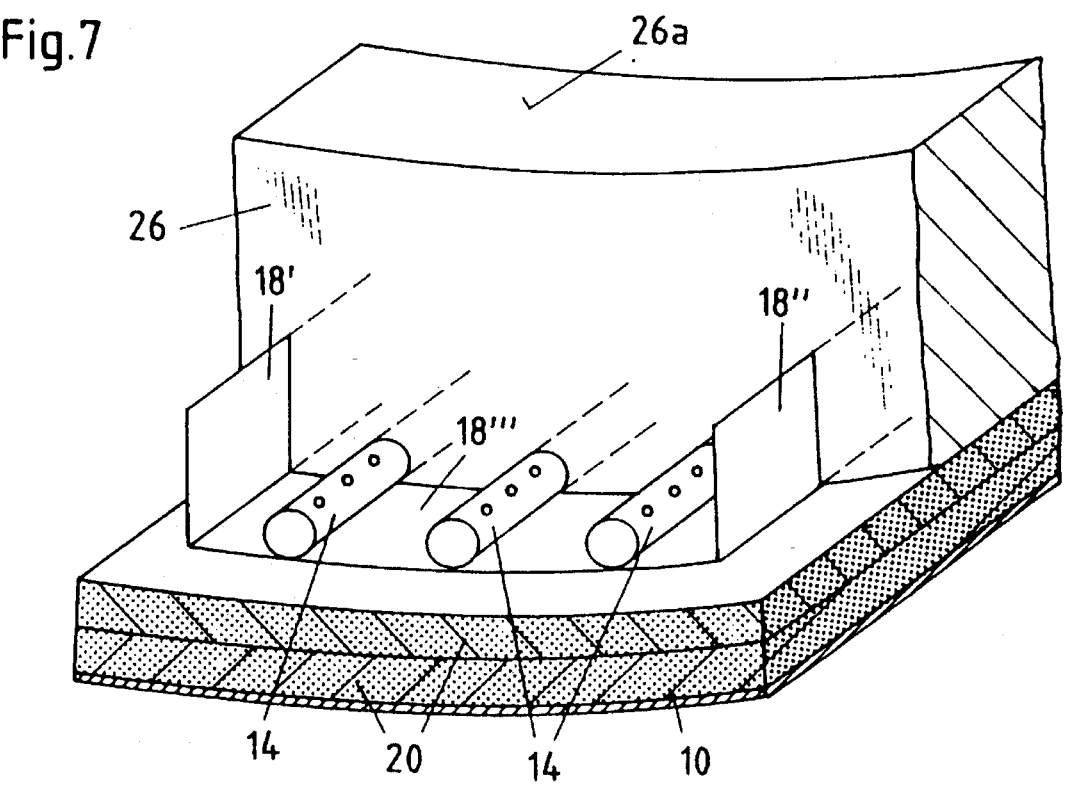

FIG. 7 shows three said tubular gas distribution devices 14 in a box-shaped receptacle, which in turn comprises said plates 18', 18" plates arranged at right angles to the said plate jacket 10, and a said plate 18''', which extends between them and lies on the said outer lining 20.

FIGS. 8 through 11 show various variants of the arrangement of the said gas distribution device 14, which are all designed as systems of pipes, of an arc furnace with electrodes 11a, 11b and 11c, as well as with an eccentric tap hole 23. The said shields 18 indicated seal off the individual pipes or groups of pipes laterally and in the downward direction.

Figure 8:
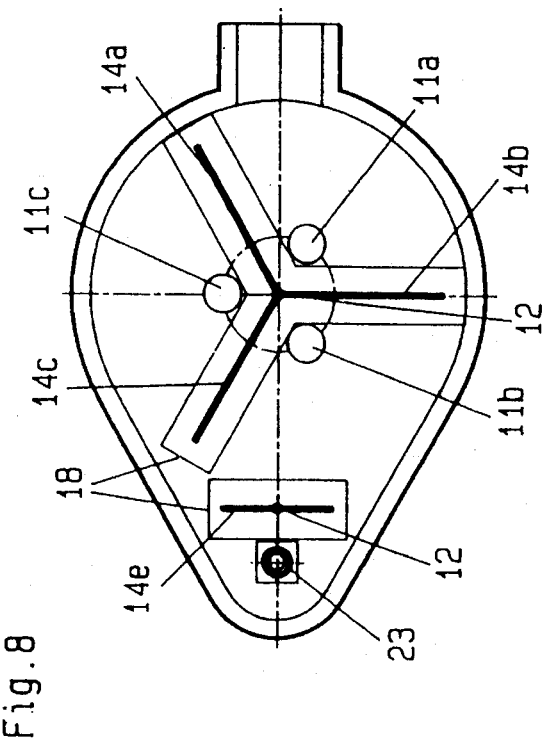

In FIG. 8, the said distribution device 14 is composed, in the area of the said electrodes 11a, 11b, and 11c, of three pipe sections 14a, 14b, and 14c arranged in a star-shaped pattern around a said gas feed line 12, as well as of a pipe section 14e, which is arranged linearly in front of the said tap hole 23 and has a separate gas feed line 12.

Figure 9:
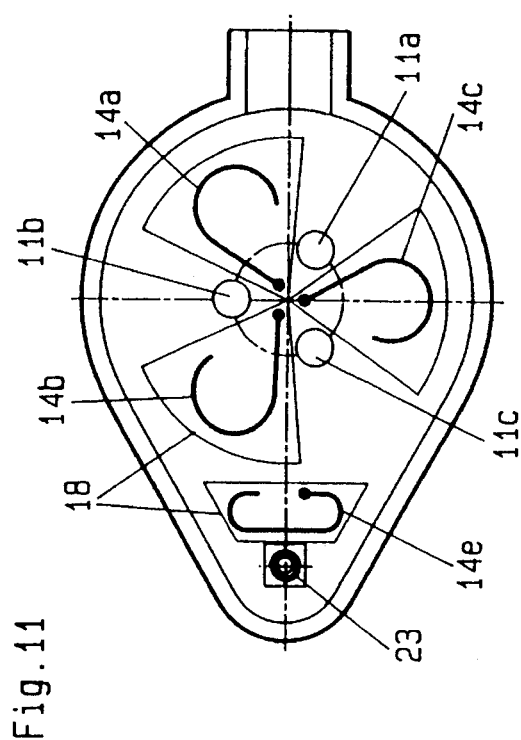
FIGS. 8, 9, 10 and 11: top views of the hearth of an electric furnace with various embodiments of gas purging devices in the tubular form.

The said pipe sections 14a, 14b, and 14c consist of two curved arms each in the embodiment variant according to FIG. 9.

Figure 10:
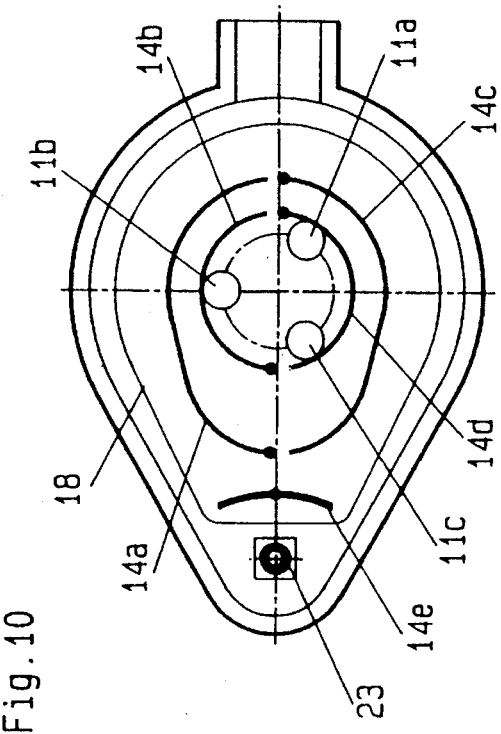

In FIG. 10, two concentric circles are formed around the center of the vessel by the said semicircular pipe sections 14a, 14b, 14c, and 14d.

Figure 11:
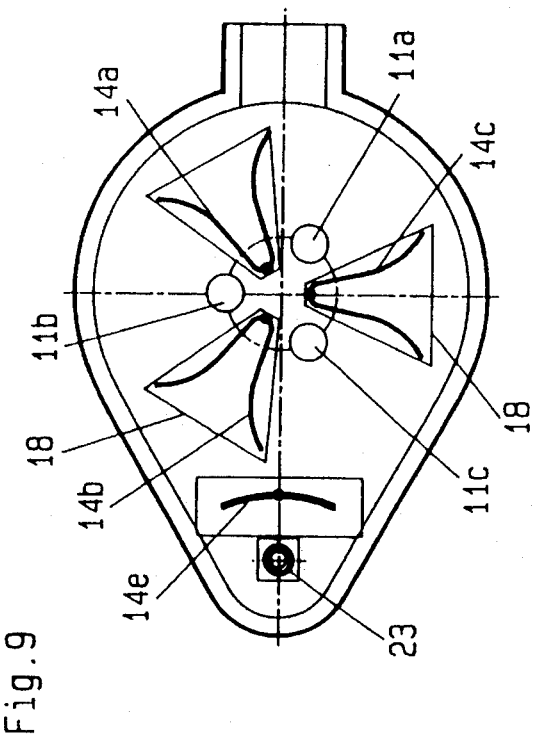

The pipe sections 14a, 14b, and 14c are designed as curved pipe sections in the embodiment according to FIG. 11.

The said pipe sections 14e provided in the vicinity of the said tap hole 23 have the task of introducing large amounts of purging gas during tapping, which is favorable for slag-free tapping.

The bottom lining permits directed, controllable feed of gas, which is of crucial significance especially in the case of use in electric arc furnaces, because irregular feed of gas could lead to such an unfavorable influence on the metal bath in isolated cases that the electrodes would come into contact with the metal melt (risk of short-circuit!). Conversely, it would also be possible for the gas flow to decrease due to lateral diffusion to the extent that sufficient circulation of the metal melt would no longer be able to be achieved. At the same time, large amounts of gas are admitted.

We claim:

1. Bottom or wall structure for a metallurgical vessel with a refractory lining (20, 26), which is adjacent to an outer metallic envelope (10) of the vessel and which has, on the side facing away from the metallic envelope (10), a wear lining (26), which is permeable to gas in at least some of its sections, and which covers with its gas-permeable section at least one gas purging device (14, 14a–e) with an associated gas feed line (12), wherein the gas purging device (14, 14a–e) is surrounded at least circumferentially by a gastight receptacle (18, 18', 18"), which projects over the gas purging device (14, 14a–e) in the upward direction into the area of the wear lining (26), wherein the area of the gas-permeable wear lining surrounded by the receptacle is free of baffle plates.

2. Bottom or wall structure in accordance with claim 1, in which the receptacle (18, 18', 18") is surrounded circumferentially by a gastight, refractory mass (24), which extends between an outer lining (20) and the wear lining (26) of the lining.

3. Bottom or wall structure in accordance with claim 2, in which the thickness of the refractory mass (24), viewed in the direction of the gas flow, corresponds to 0.1 to 0.5 times the height of the gas purging device (14, 14a–e), and the width of the refractory mass (24), viewed radially to the direction of the gas flow, corresponds to 0.5 to 5 times the height of the gas purging device (14, 14a–e).

4. Bottom or wall structure in accordance with claim 2, in which the refractory mass (24) is limited circumferentially by a gastight ring, which extends, starting from the outer lining, via the receptacle and the refractory lining and into the wear lining.

5. Bottom or wall structure in accordance with claim 1, in which a gastight, refractory mass, which extends between the outer lining and the wear lining, is provided between the gas purging device and the receptacle.

6. Bottom or wall structure in accordance with claim 1, in which the receptacle (18, 18', 18") and the ring (22) consist of a monolithic component.

7. Bottom or wall structure in accordance with claim 1, in which the receptacle (18, 18', 18") and the ring (22) are formed by a row of bricks assembled from discrete refractory elements.

8. Bottom or wall structure in accordance with claim 1, in which the receptacle (18, 18', 18"), the ring (22) or both the receptacle and the ring consist of a metallic material.

9. Bottom or wall structure in accordance with claim 5, in which the receptacle (18, 18', 18"), the ring (22) or both the receptacle and the ring extend into the wear lining (26) over up to ⅔ of the thickness of the wear lining (26).

10. Bottom or wall structure in accordance with claim 1, in which the mass (24), the receptacle (18, 18', 18") or the ring (22) consist of a chemically or carbon-bound ceramic grade.

11. Bottom or wall structure in accordance with claim 10, in which the mass (24), the receptacle (18, 18', 18"), or the ring (22) consist of a pitch- or tar-bound ceramic grade.

12. Bottom or wall structure in accordance with claim 1, in which the mass (24), the receptacle (18, 18', 18"), or the ring (22) consist of a magnesitic grade.

13. Bottom or wall structure in accordance with claim 1, in which the outer lining (20) consists of magnesite.

14. Bottom or wall structure in accordance with claim 1, in which the wear lining (26) consists of a dry monolithic lining material made of sintered magnesia with an MgO content exceeding 50 wt. %.

15. Bottom or wall structure in accordance with claim 1, in which the section of the wear lining (26) extending directly above the gas purging device (14, 14a–e) consists of coarser granular material than the rest of the wear lining (26), wherein the coarser granular material has a network of open pores even after sintering or fritting.

16. Bottom or wall structure in accordance with claim 1, in which the section of the wear lining (26) extending directly above the gas purging device (14, 14a–e) consists of a mass with a particle size of 3 to 8 mm.

17. Bottom or wall structure in accordance with claim 1, in which the gas purging device (14) consists of a gas purging plug with directed porosity.

18. Bottom or wall structure in accordance with claim 17, in which the gas purging plug has an axial central gas channel formed by a pipe and an outer pipe surrounding the pipe at a spaced location, wherein the pipes are positioned such that they form an annular gap extending between them, and the inner pipe and the annular gap can be connected to separate gas feed lines.

19. Bottom or wall structure for a metallurgical vessel with a refractory lining (20, 26), which is adjacent to an outer metallic envelope (10) of the vessel and which has, on the side facing away from the metallic envelope (10), a wear lining (26), which is permeable to gas in at least some of its sections, and which covers with it gas-permeable section at least one gas purging device (14, 14a–e) with an associated gas feed line (12), wherein the gas purging device (14, 14a–e) is surrounded at least circumferentially by a gastight receptacle (18, 18', 18"), which projects over the gas purging device (14, 14a–e) in the upward direction into the area of the wear lining (26), wherein the area of the gas-permeable wear lining surrounded by the receptacle is free of baffle plates, in which the gas purging device (14) consists of a gas purging plug with directed porosity, in which the gas purging plug has an axial central gas channel formed by a pipe and an outer pipe surrounding the pipe at a spaced location, wherein the pipes are positioned such that they form an annular gap extending between them, and the gas purging plug is provided with a plurality of flow channels through the matrix material of the purging plug, which extend in parallel to the pipes, distributed statistically around the pipes, and open into a gas distribution chamber on the side facing away from the metal melt, wherein the gas distribution chamber, the annular channel, and the gas channel formed by the pipe are sealed off against each other and can be connected to separate gas feed lines.

20. Bottom or wall structure for a metallurgical vessel with a refractory lining (20, 26), which is adjacent to an outer metallic envelope (10) of the vessel and which has, on the side facing away from the metallic envelope (10), a wear lining (26), which is permeable to gas in at least some of its sections, and which covers with its gas-permeable section at least one gas purging device (14, 14a–e) with an associated gas feed line (12), wherein the gas purging device (14, 14a–e) is surrounded at least circumferentially by a gastight receptacle (18 18', 18"), which projects over the gas purging device (14, 14a–e) in the upward direction into the area of the wear lining (26), wherein the area of the gas-permeable wear lining surrounded by the receptacle is free of baffle plates, in which the gas purging device (14, 14a–e) is designed as a system of pipes with a plurality of gas outlets (17).

21. Bottom or wall structure for a metallurgical vessel with a refractory lining (20, 26), which is adjacent to an outer metallic envelope (10) of the vessel and which has, on the side facing away from the metallic envelope (10), a wear lining (26), which is permeable to gas in at least some of its sections, and which covers with its gas-permeable section at least one gas purging device (14, 14a–e) with an associated gas feed line (12), wherein the gas purging device (14, 14a–e) is surrounded at least circumferentially by a gastight receptacle (18, 18', 18"), which projects over the gas purging device (14, 14a–e) in the upward direction into the area of the wear lining (26), wherein the area of the gas-permeable wear lining surrounded by the receptacle is free of baffle plates, in which the gas purging device (14, 14a–e) is designed as a large-surface-area hollow box, into which the gas feed line (12) opens at a point, and which is provided with a plurality of gas outlets (17) on its cover side, which is its top side in the direction of the gas flow.

22. Bottom or wall structure in accordance with claim 20, in which the hollow box of the gas purging device (14, 14a–e) is filled with a coarse granular, refractory bulk material (9).

23. Bottom or wall structure in accordance with claim 1, in which the gas purging device (14, 14a–e) stands directly on the metallic envelope (10) of the vessel or on the outer lining (20).

24. Use of a bottom or wall structure in accordance with one of the claims 1 through 23 in an electric arc furnace.

25. Bottom or wall structure for a metallurgical vessel with a refractory lining (20, 26), which is adjacent to an outer metallic envelope (10) of the vessel and which has, on the side facing away from the metallic envelope (10), a wear lining (26), which is permeable to gas in at least some of its sections, and which covers with its gas-permeable section at least one gas purging device (14) with an associated gas feed line (12), wherein the gas purging device (14) is surrounded at least circumferentially by a gastight receptacle (18, 18', 18"), which projects over the gas purging device (14) in the upward direction into the area of the wear lining (26), wherein the area of the gas-permeable wear lining surrounded by the receptacle is free of baffle plates,

- in which the receptacle (18, 18', 18") is surrounded circumferentially by a gastight, refractory mass (24), which extends between an outer lining (20) and the wear lining (26) of the lining,
- in which the thickness of the refractory mass (24) viewed in the direction of the gas flow corresponds to 0.1 to 0.5 times the height of the gas purging device (14), and the width of the refractory mass (24) viewed radially to the direction of the gas flow corresponds to 0.5 to 5 times the height of the gas purging device (14),
- in which the refractory mass (24) is limited circumferentially by a gastight ring, which extends, starting from the outer lining, via the receptacle and the refractory lining and into the wear lining,
- in which a gastight, refractory mass, which extends between the outer lining and the wear lining, is provided between the gas purging device and the receptacle,
- in which the receptacle (18, 18', 18") and the ring (22) consist of a monolithic component,
- in which the receptacle (18, 18', 18"), the ring (22), or both the receptacle and the ring, extend into the wear lining (26) over up to ⅔ of the thickness of the wear lining (26),
- in which the mass (24), the receptacle (18, 18', 18") or the ring (22) consist of a chemically or carbon-bound ceramic grade, a pitch- or tar-bound ceramic grade, or a magnesitic grade, or the receptacle (18, 18', 18") and/or the ring (22) consist of a metallic material,
- in which the outer lining (20) consists of magnesite,
- in which the wear lining (26) consists of a dry monolithic lining material made of sintered magnesia with an MgO content exceeding 50 wt. %,
- in which the section of the wear lining (26) extending directly above the gas purging device (14) consists of coarser granular material than the rest of the wear lining (26), wherein the coarser granular material has a network of open pores even after sintering or fritting,
- in which the section of the wear lining (26) extending directly above the gas purging device (14) consists of a mass with a particle size of 3 to 8 mm,
- in which the gas purging device (14) consists of a gas purging plug with directed porosity,
- in which the gas purging plug has an axial central gas channel formed by a pipe and an outer pipe surrounding the pipe at a spaced location, wherein the pipes are positioned such that they form an annular gap extending between them, and the gas purging plug is provided with a plurality of flow channels through the matrix material of the purging plug, which extend in parallel to the pipes, distributed statistically around the pipes, and open into a gas distribution chamber on the side facing away from the metal melt, wherein the gas distribution chamber, the annular channel, and the gas channel formed by the pipe are sealed off against each other and can be connected to separate gas feed lines,
- in which the gas purging device (14) stands directly on the metallic envelope (10) of the vessel or on the outer lining (20), and
- in which the bottom or wall structure is used in an electric arc furnace.

* * * * *